(12) United States Patent
Shimokawa

(10) Patent No.: US 8,519,569 B2
(45) Date of Patent: Aug. 27, 2013

(54) WIRELESS POWER SUPPLY SYSTEM AND WIRELESS POWER SUPPLY METHOD

(75) Inventor: Satoshi Shimokawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 235 days.

(21) Appl. No.: 12/721,770

(22) Filed: Mar. 11, 2010

(65) Prior Publication Data
US 2010/0244577 A1 Sep. 30, 2010

(30) Foreign Application Priority Data

Mar. 30, 2009 (JP) .................................. 2009-082381

(51) Int. Cl.
*H01F 27/42* (2006.01)
*H01F 37/00* (2006.01)
*H01F 38/00* (2006.01)

(52) U.S. Cl.
USPC .......................................................... 307/104

(58) Field of Classification Search
USPC ......................................... 307/9.1, 10.1, 104
See application file for complete search history.

(56) References Cited

U.S. PATENT DOCUMENTS

| | | | |
|---|---|---|---|
| 2,967,267 A | 1/1961 | Steinman et al. | |
| 5,455,467 A | 10/1995 | Young et al. | |
| 5,821,731 A * | 10/1998 | Kuki et al. | 320/108 |
| 5,898,579 A | 4/1999 | Boys et al. | |
| 6,958,583 B1 | 10/2005 | An | |
| 7,667,352 B2 | 2/2010 | Drechsler et al. | |

| | | |
|---|---|---|
| 2007/0222542 A1 | 9/2007 | Joannopoulos et al. |
| 2008/0079392 A1 | 4/2008 | Baarman et al. |
| 2008/0266748 A1 | 10/2008 | Lee |
| 2008/0278264 A1 | 11/2008 | Karalis et al. |
| 2011/0254378 A1 | 10/2011 | Ichikawa et al. |
| 2011/0285210 A1 | 11/2011 | Lemmens et al. |

FOREIGN PATENT DOCUMENTS

| | | |
|---|---|---|
| JP | 8-501435 | 2/1996 |
| JP | 2002-101578 | 4/2002 |
| JP | 2008-508842 | 3/2008 |
| JP | 2008-263710 | 10/2008 |
| JP | 2009-501510 | 1/2009 |
| WO | WO 2006/011769 A1 | 2/2006 |
| WO | WO 2007/008646 A2 | 1/2007 |
| WO | WO 2009/014125 A1 | 1/2009 |

OTHER PUBLICATIONS

US Office Action issued in U.S. Appl. No. 12/750,774, mailed Jan. 6, 2012.

(Continued)

*Primary Examiner* — Carlos Amaya
(74) *Attorney, Agent, or Firm* — Greer, Burns & Crain, Ltd.

(57) ABSTRACT

A wireless power supply apparatus includes: a transmitting coil configured to transmit power in the form of magnetic field energy using magnetic resonance; and a power transmitter configured to supply power at a resonant frequency that produces magnetic resonance between the transmitting coil and a receiving coil; wherein the power transmitter includes a detector configured to detect current flowing into the transmitting coil, a controller configured to control the frequency of the power supplied to the transmitting coil, and a determining unit configured to determine the coupling strength between the transmitting coil and the receiving coil on the basis of the frequency of the current detected by the detector as well as the frequency of the supplied power.

12 Claims, 15 Drawing Sheets

(56) References Cited

OTHER PUBLICATIONS

US Office Action issued in U.S. Appl. No. 12/750,774, mailed Apr. 13, 2012.

Notification of Reasons for Refusal issued by the Japanese Patent Office in Japanese Pat. App. No. 2009-082381, mailed May 16, 2013 (with English translation).

Imura et al.; "A Unified Explanation of Electromagnetic Induction and Electromagnetic Resonant Coupling for Contactless Power Transfer", Material of Study Group of the Institute of Electrical Engineers of Japan, VT, Motor Vehicle Study Group, Japan, The Institute of Electrical Engineers of Japan, Jan. 22, 2009, 2009(1), 35-40.

\* cited by examiner

CASE WHERE $\kappa/G \leq 1$

CASE WHERE $\kappa/G > 1$

WIRELESS POWER SUPPLY SYSTEM AND WIRELESS POWER SUPPLY METHOD

CROSS-REFERENCE TO RELATED APPLICATIONS

This application is based upon and claims the benefit of priority of the prior Japanese Patent Application No. 2009-82381, filed on Mar. 30, 2009, the entire contents of which are incorporated herein by reference.

FIELD

The disclosure of the present application relates to a wireless power supply system and a wireless power supply method.

BACKGROUND

There exist systems for wirelessly transmitting power (i.e., energy). In Japanese Unexamined Patent Application Publication No. 2002-101578, electromagnetic induction techniques are discussed. The above system includes an electromagnetic wave technique. In Japanese Unexamined Patent Application Publication (Translation of PCT Application) No. 2009-501510, magnetic resonance techniques are discussed. In all of the above techniques, various contrivances increase the power supply efficiency. Japanese Unexamined Patent Application Publication No. 2002-101578 discloses technology for a contactless power transfer apparatus that wireless transmits power by electromagnetic induction. In this apparatus, when the relative positions of a primary coil (i.e., the transmitting coil) and a secondary coil (i.e., the receiving coil) change, factors such as the frequency of the current flowing in the primary coil are adjusted to keep the output from the secondary coil constant.

SUMMARY

According to an aspect of the invention, a wireless power supply apparatus includes: a transmitting coil configured to transmit power in the form of magnetic field energy using magnetic resonance; and a power transmitter configured to supply power at a resonant frequency that produces magnetic resonance between the transmitting coil and a receiving coil; wherein the power transmitter includes a detector configured to detect current flowing into the transmitting coil, a controller configured to control the frequency of the power supplied to the transmitting coil, and a determining unit configured to determine the coupling strength between the transmitting coil and the receiving coil on the basis of the frequency of the current detected by the detector as well as the frequency of the supplied power.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
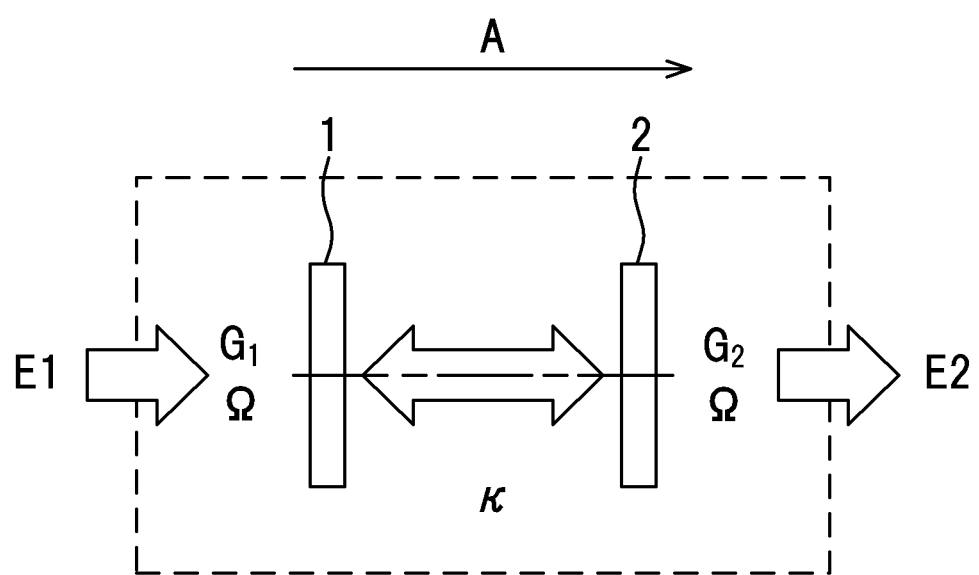
FIG. 1 is a schematic diagram illustrating the basic concept of a wireless power supply system.

However, in JP-A-2002-101578 described above, the power supply efficiency drops from the primary coil to the secondary coil. In other words, the system is controlled such that, when the gap between the primary coil and the secondary coil is large, the amplitude and frequency of the voltage applied to the primary coil is increased to obtain a large output at the secondary coil. For this reason, the difference increases between the energy produced by the primary coil and the energy produced by the secondary coil, and the power supply efficiency drops. Moreover, JP-A-2009-501510 does not disclose technology for improving the power supply efficiency.

It is therefore desirable to provide a wireless power supply system and a wireless power supply method for improving power supply efficiency.

A wireless power supply system disclosed in the present specification includes: a transmitting coil configured to transmit power in the form of magnetic field energy using magnetic resonance; and a power transmitter configured to supply power at a resonant frequency that produces magnetic resonance between the transmitting coil and a receiving coil. The power transmitter includes: a detector configured to detect current flowing into the transmitting coil; a controller configured to control the frequency of the power supplied to the transmitting coil; and a determining unit configured to determine the coupling strength between the transmitting coil and the receiving coil on the basis of the frequency of the current detected by the detector.

A wireless power supply system disclosed in the present specification includes: a transmitting coil configured to transmit power in the form of magnetic field energy using magnetic resonance; a receiving coil configured to receive the magnetic field energy transmitted from the transmitting coil, and convert the received energy into power; and a power transmitter configured to supply power at a resonant frequency that produces magnetic resonance between the transmitting coil and the receiving coil. The power transmitter includes: a detector configured to detect current flowing into the transmitting coil; a controller configured to control the frequency of the power supplied to the transmitting coil; and a determining unit configured to determine the coupling strength between the transmitting coil and the receiving coil on the basis of the frequency of the current detected by the detector.

A wireless power supply method disclosed in the present specification includes the steps of: transmitting power from a transmitting coil in the form of magnetic field energy using magnetic resonance; supplying power at a resonant frequency that produces magnetic resonance between the transmitting coil and a receiving coil; detecting current flowing into the transmitting coil; and determining the coupling strength between the transmitting coil and the receiving coil on the basis of the frequency of the detected current.

According the disclosure of the present application, it is possible to provide a wireless power supply system and a wireless power supply method that improve power transmission efficiency.

In the wireless power supply system, the controller may be configured to sweep the frequency of the power supplied to the transmitting coil, and the determining unit may be configured to determine the coupling strength between the transmitting coil and the receiving coil on the basis of the frequency characteristics of the amplitude of the current flowing into the transmitting coil as detected by the detector.

In the wireless power supply system, the controller may be configured to sweep the frequency of the power supplied to the transmitting coil, and the determining unit may be configured to determine the coupling strength between the transmitting coil and the receiving coil on the basis of the frequency characteristics of the phase between the current flowing into the transmitting coil as detected by the detector, and the power supplied to the transmitting coil.

In the wireless power supply system, the power transmitter may be configured such that, on the basis of the determination results of the determining unit, the power transmitter outputs a move command signal to an apparatus provided in the receiving coil.

Embodiments

1. Configuration of Wireless Power Supply System

Techniques for wireless power supply systems include electromagnetic induction, electromagnetic waves (i.e., beaming), and magnetic resonance. Electromagnetic induction enables transmission of large amounts of power, but increasing the transmission distance is difficult. In contrast, electromagnetic waves enable increased transmission distances, but increasing the amount of transmittable power is difficult. Magnetic resonance enables power transmission distances to be increased beyond that of electromagnetic induction, while also enabling power transmission in amounts greater than that of electromagnetic waves.

Electromagnetic resonance techniques involve placing a transmitting coil and a receiving coil at a distance, with each coil having the same resonant frequency. A current at a frequency identical to the resonant frequency is then made to flow through the transmitting coil. In so doing, a magnetic field oscillates between the transmitting coil and the receiving coil, and resonance occurs between the transmitting coil and the receiving coil. By producing such resonance, power may be supplied from the transmitting coil to the receiving coil via the magnetic field produced between the transmitting coil and the receiving coil. According to a wireless power supply system based on such electromagnetic resonance techniques, power supply efficiency on the order of several tens of percent may be achieved, and in addition, the respective apparatus may be separated by a distance of several tens of centimeters or more.

Although the coils are described as having the same resonant frequency herein, the resonant frequencies are not limited to being exactly identical. Even if the resonant frequencies of a plurality of resonant circuits match in a simulation or similar virtual space, in practice the resonant frequencies of a plurality of resonant circuits rarely match exactly. Consequently, referring to resonant frequencies as being the same herein includes that state in which the resonant frequencies are essentially the same. The range of being essentially the same is determined by a Q value. The range of being essentially the same narrows as the Q value increases. Likewise, the range of being essentially the same widens as the Q value decreases. A reasonable standard for the range of being essentially the same may be, for example, the frequency range wherein the value of the resonance point is halved. Alternatively, the range of being essentially the same may be set to a frequency range wherein a target efficiency is reached. Stated differently, the range of being essentially the same may be said to be the frequency range enabling power transmission that is more efficient than that of electromagnetic induction. It should be appreciated that such a range wherein frequencies are considered the same can be determined by the common knowledge of those skilled in the art. However, technicians not possessing the common knowledge of those skilled in the art often consult the available literature in some cases. The above explanation is given in consideration of such cases, and the scope of the invention is not to be limited by the foregoing explanation.

In order to increase the power supply efficiency between the transmitting coil and the receiving coil, it is preferable to decrease the power loss, while also increasing the coupling strength of the transmitting coil and the receiving coil. Power loss may be decreased by suppressing radiation loss and internal loss in the respective resonant coils. Meanwhile, the coupling strength is largely affected by the shapes of the respective resonant coils and their relative positions. It is conceivable to position the two resonant coils by using commonly available devices such as a mechanical guide or optical sensors, but both of the above are indirect means for maximizing the coupling strength. As a result, it is considered difficult to realize optimal positioning operations.

FIG. 1 is a schematic diagram illustrating an exemplary wireless power supply system.

The transmitting coil 1 is open at both ends. The transmitting coil 1 is not connected to an electrical circuit in order to increase the Q value. The transmitting coil 1 includes a capacitor realized by means of stray capacitance. As a result, the transmitting coil 1 forms an LC resonant circuit. It should be appreciated that the capacitor is not limited to being realized by stray capacitance, and that an LC resonant circuit may also be realized by connecting both ends of the coil with a capacitor. The Q value expressing the sharpness of the resonance is determined by the pure resistance and the radiation resistance of the coil, and larger Q values may be obtained with decreasing resistance values. The resonant frequency f may be computed from the inductance L and the capacitance C of the capacitor, according to the following Eq. 1, for example.

$$f = \frac{1}{2\pi\sqrt{LC}} \quad (1)$$

Power is supplied to the transmitting coil 1 from a power supply coil (not illustrated) by means of electromagnetic induction. The transmitting coil 1 and the power supply coil are placed close enough to enable power supply by electromagnetic induction. By using electromagnetic induction to wirelessly connect the transmitting coil 1 and the power supply coil, the oscillator circuit connected to the power supply coil is less likely to affect the resonance characteristics of the transmitting coil. As a result, freer design of the oscillator circuit is made possible. The power supply coil is connected to a power source with a cable via the oscillator circuit, and alternating-current (AC) power at a given frequency is supplied from the oscillator circuit. Hereinafter, in order to simplify explanation, an example will be described wherein the oscillator circuit is electrically connected to the transmitting coil directly, and power is input into the transmitting coil using voltage and current. By inputting into the transmitting coil 1 a current (i.e., energy E1) having the same resonant frequency as that of the transmitting coil 1 and the receiving coil 2, a magnetic field is produced around the transmitting coil 1, and resonance occurs between the transmitting coil 1 and the receiving coil 2. In so doing, power may be supplied from the transmitting coil 1 to the receiving coil 2. The receiving coil 2 is able to supply the power supplied from the transmitting coil 1 (i.e., energy E2) to the load.

The receiving coil 2 is open at both ends. Similarly to the transmitting coil 1, the receiving coil 2 is not connected to an electrical circuit in order to increase the Q value. Similarly to the transmitting coil 1, the receiving coil 2 forms an LC resonant circuit. Power is retrieved from the receiving coil 2 by a power retrieval coil (not illustrated), by means of electromagnetic induction. The power retrieval coil is connected to the load that consumes power. Connected between the power retrieval coil and the load is an output circuit that retrieves the power, and converts it into the power consumed by the load. The output circuit is a circuit that converts power into voltage that may be applied to the load, and thus may be a transformer or AC-DC converter. The receiving coil 2 is configured similarly to the transmitting coil 1, and includes a coil unit as well as a capacitor. The resonant frequency of the receiving coil 2 matches the resonant frequency f of the transmitting coil 1. By causing such a receiving coil 2 to resonate with a nearby transmitting coil 1 at the same resonant frequency, a magnetic resonance mode is produced. The receiving coil 2 is then wirelessly supplied with power from the transmitting coil 1. The power supplied to the receiving coil 2 is supplied to the load by wire via the power retrieval coil and a rectifier circuit. Hereinafter, in order to simplify explanation, an example will be described wherein the receiving coil is electrically connected to the output circuit directly, and wherein the power received by the receiving coil is input into the output circuit as AC power. When transmitting power between the transmitting coil 1 and the receiving coil 2, the transmission efficiency depends on a performance index expressed by way of example with the following Eq. 2.

$$\text{Performance index} = \frac{\kappa}{\sqrt{G1 \cdot G2}} \quad (2)$$

κ: magnitude of energy flow per unit time (i.e., the coupling strength between resonant coils)

G1: energy loss per unit time of the transmitting coil 1

G2: energy loss per unit time of the receiving coil 2

According to the above Eq. 2, in order to increase the energy transmission efficiency between the transmitting coil 1 and the receiving coil 2, the energy loss G1 and G2 should be decreased, while the coupling strength κ should be increased. The energy loss G1 and G2 may be decreased by suppressing radiation loss and internal loss in the transmitting coil 1 and the receiving coil 2. Meanwhile, the coupling strength κ is largely affected by the respective shapes of the transmitting coil 1 and the receiving coil 2, and their relative positions. In other words, the coupling strength κ falls as the gap size between the coils is increased, and rises as the gap size is decreased. Furthermore, the coupling strength κ also varies when the relative positions of the coils are shifted in a direction intersecting the power transmission direction A.

Hereinafter, the relationship between the transmission characteristics and the relative positions of the transmitting coil 1 and the receiving coil 2 will be described. For the sake of simplicity herein, the energy loss characteristics of both coils are taken to be the same, such that G=G1=G2. Given the above, Eq. 2 becomes $$\text{Performance index} = \frac{\kappa}{G} \quad (3)$$

In the present embodiment, the above ratio of the coupling strength κ between the transmitting coil 1 and the receiving coil 2 versus the energy loss G is used to define the following by way of example. The case wherein κ/G is greater than 1 is herein defined to be the strongly coupled regime, while the case wherein κ/G is less than or equal to 1 is herein defined to be the weakly coupled regime.

Figure 2A:
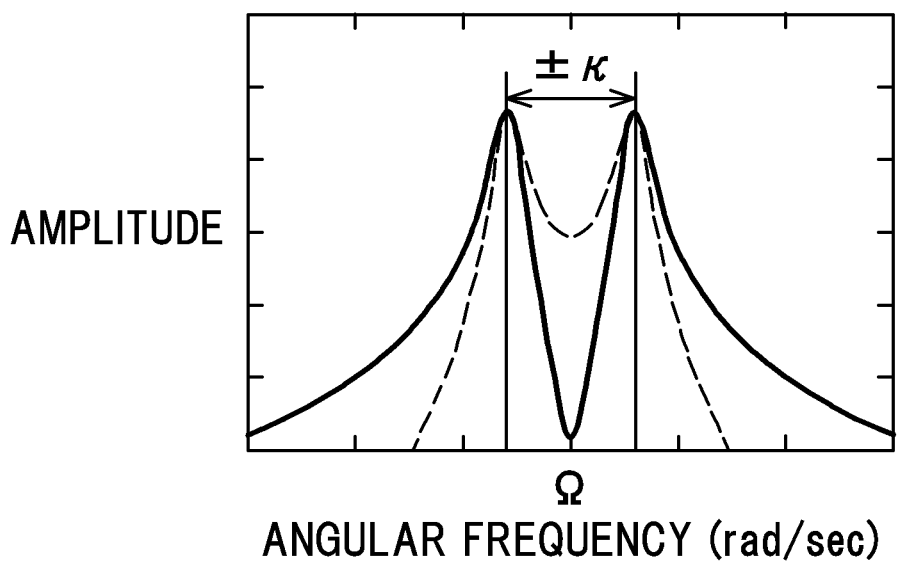
FIGS. 2A and 2B are graphs illustrating frequency characteristics in the strongly coupled regime.
Figure 2B:
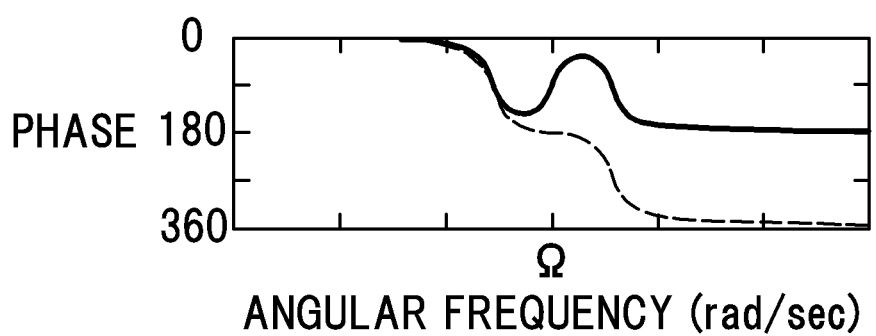

FIGS. 2A and 2B illustrate coil current characteristics with respect to a magnetic field coupling the transmitting coil 1 and the receiving coil 2 such that the coils are in the strongly coupled regime (κ/G>1). FIGS. 2A and 2B are plots of angular frequency, wherein the characteristics of the current flowing into the respective coils are illustrated at each frequency while a constant voltage is applied to the transmitting coil, for example. In the case where applying a constant voltage is unavailable, the ratio with respect to voltage should also be considered. FIG. 2A illustrates the change in the amplitude of the current flowing into the respective coils when voltages at respective angular frequencies are applied to the transmitting coil. FIG. 2B illustrates the change in the phase of the current flowing into the respective coils when voltages at respective angular frequencies are applied to the transmitting coil, with the phase of the applied voltage used as a basis. In FIGS. 2A and 2B, the solid lines illustrate the angular frequency characteristics of the current flowing into the transmitting coil 1, while the broken line illustrates the angular frequency characteristics of the current flowing into the receiving coil 2. The angular frequency Ω is identical to the resonant frequency of the transmitting coil 1 and the receiving coil 2. As illustrated in FIG. 2A, when the transmitting coil 1 and the receiving coil 2 are in the strongly coupled regime, the amplitude drops at the angular frequency Ω, while a split amplitude peak occurs at the same frequency in the positive and negative directions from the angular frequency Ω.

Figure 3A:
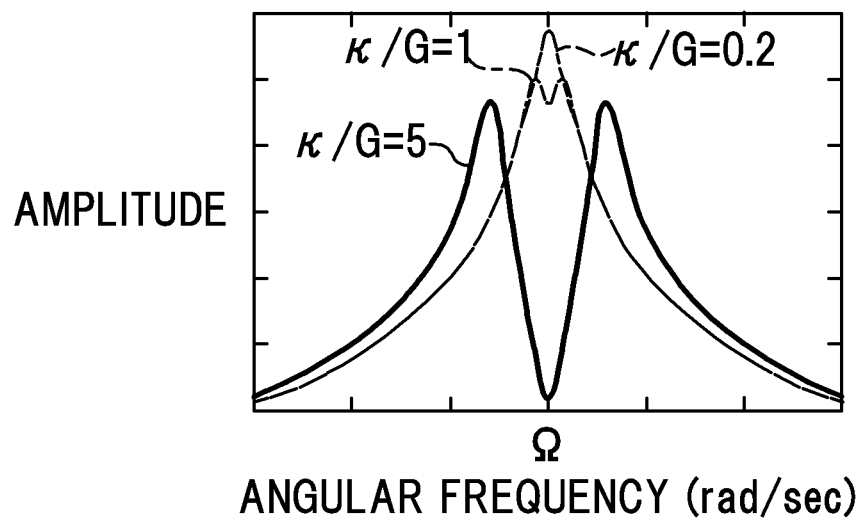
FIGS. 3A and 3B are graphs illustrating frequency characteristics in the transmitting coil when the energy loss G is constant and the coupling strength κ is varied.
Figure 3B:
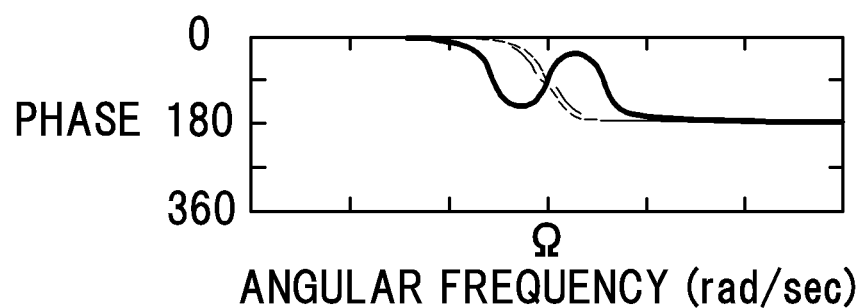

FIGS. 3A and 3B illustrate angular frequency characteristics in the transmitting coil 1 when the energy loss G is constant and the coupling strength κ is varied. FIG. 3A illustrates the change in the amplitude of the current flowing into the transmitting coil 1 when voltages at respective angular frequencies are applied. FIG. 3B illustrates the change in the phase of the current flowing into the transmitting coil 1 when voltages at respective angular frequencies are applied to the transmitting coil, with the phase of the applied voltage used as a basis. In FIGS. 3A and 3B, the solid lines illustrate the characteristics for the case wherein κ/G=5 (i.e., the strongly coupled regime), the chain lines illustrate the characteristics for the case wherein κ/G=1, and the broken lines illustrate the characteristics for the case wherein κ/G=0.2 (i.e., the weakly coupled regime). As illustrated in FIG. 3A, when the transmitting coil 1 and the receiving coil 2 are in the weakly coupled regime, an amplitude peak is produced near the angular frequency Ω (see the broken line). As the coupling strength between the transmitting coil 1 and the receiving coil 2 becomes stronger, the amplitude level near the angular frequency Ω drops, and the amplitude peak shifts to a symmetrical high-frequency and low-frequency split peak (see the chain line and the solid line).

Figure 4A:
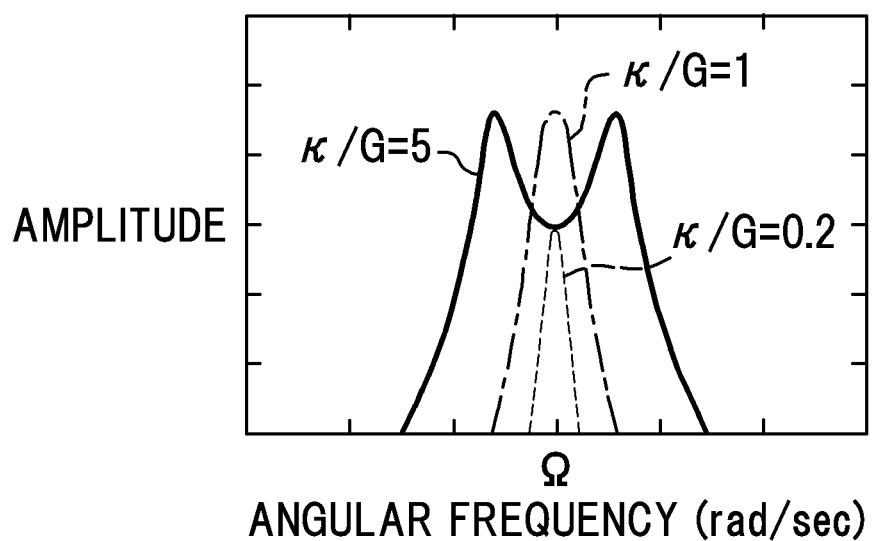
FIGS. 4A and 4B are additional graphs illustrating frequency characteristics in the receiving coil when the energy loss G is constant and the coupling strength κ is varied.
Figure 4B:
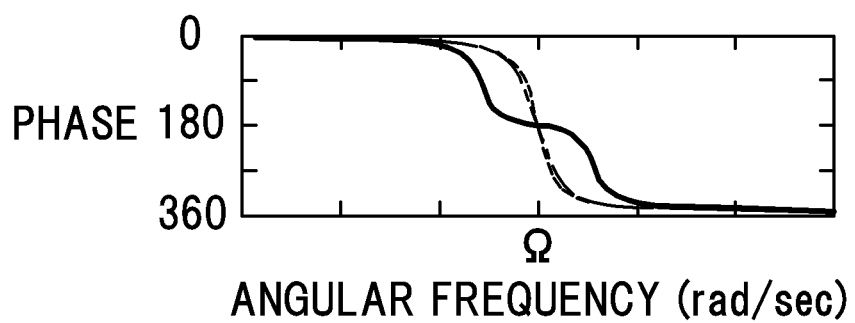

FIGS. 4A and 4B illustrate angular frequency characteristics in the receiving coil 2 when the energy loss G is constant and the coupling strength κ is varied. FIG. 4A illustrates the change in the amplitude of the current flowing into the receiving coil 2 when voltages at respective angular frequencies are applied. FIG. 4B illustrates the change in the phase of the current flowing into the receiving coil 2 when voltages at respective angular frequencies are applied to the transmitting coil, with the phase of the applied voltage used as a basis. In FIGS. 4A and 4B, the solid lines illustrate the characteristics for the case wherein κ/G=5 (i.e., the strongly coupled regime), the chain lines illustrate the characteristics for the case wherein κ/G=1, and the broken lines illustrate the characteristics for the case wherein κ/G=0.2 (i.e., the weakly coupled regime). As illustrated in FIG. 4A, when the transmitting coil 1 and the receiving coil 2 are in the weakly coupled regime, an amplitude peak is produced near the angular frequency Ω, but the amplitude level is low (see the broken line). As the coupling strength between the transmitting coil 1 and the receiving coil 2 becomes stronger, the amplitude level near the angular frequency Ω rises (see the chain line), and as the coupling strength further increases, the amplitude peak shifts to a symmetrical high-frequency and low-frequency split peak (see the solid line).

As illustrated in FIGS. 2A to 4B, as a result of the transmitting coil 1 and the receiving coil 2 entering the strongly coupled regime, the current flowing into the respective coils with respect to a voltage applied to the transmitting coil exhibits the following angular frequency characteristics. The amplitude level drops near the angular frequency Ω, and a split amplitude peak forms at frequencies separated from the angular frequency Ω in the positive and negative directions. By detecting such angular frequency characteristics, it becomes possible to detect the coupling regime of the transmitting coil 1 and the receiving coil 2. For this reason, information about the detected coupling regime may be utilized when detecting and correcting the relative positions of the transmitting coil 1 and the receiving coil 2.

2. Positioning Control Method for Wireless Power Supply System

Figure 5:
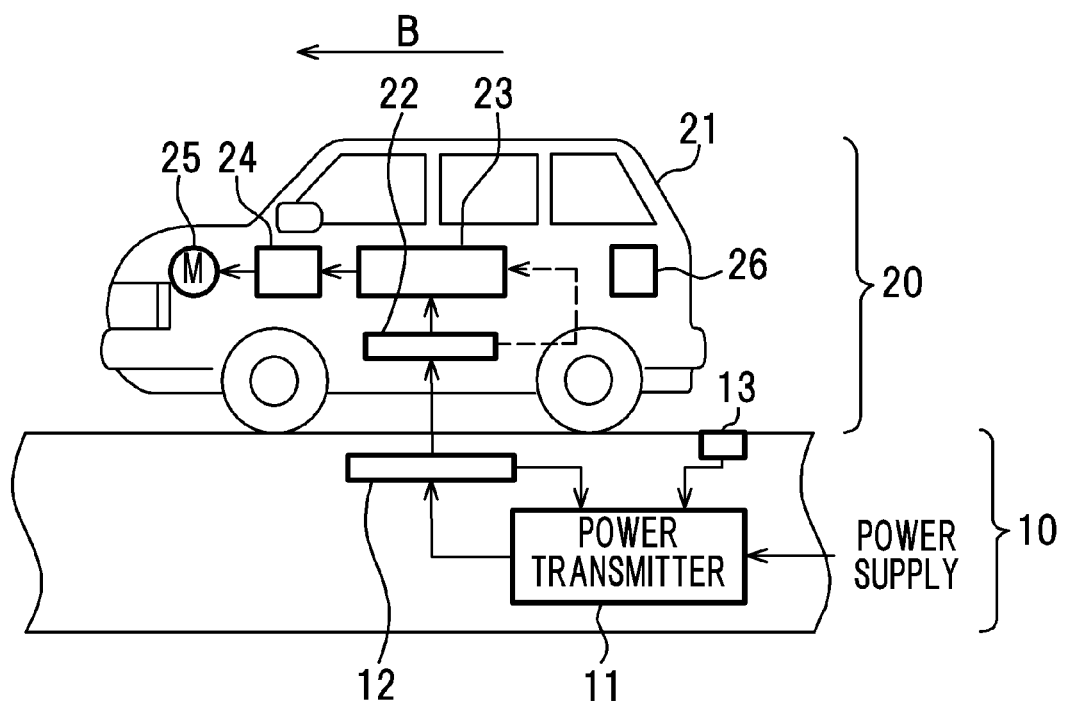
FIG. 5 is a schematic diagram of a charging system, herein illustrated as one example of a wireless power supply system.

FIG. 5 is a schematic diagram of a charging system for an electric car, herein illustrated as one example of a wireless power supply system. The charging system illustrated in FIG. 5 is able to charge a battery 24 mounted onboard an electric car 21.

The transmitting apparatus 10 is provided with a power transmitter 11, a transmitting coil 12, and a weight sensor 13, and is embedded into the ground, for example. The power transmitter 11 supplies externally-supplied power to the transmitting coil 12. The transmitting coil 12 supplies the power supplied from the power transmitter 11 to the electric car 21, on the basis of electromagnetic resonance. The weight sensor 13 detects the weight of the electric car 21, and is able to detect when the electric car 21 has entered the charging area of the transmitting apparatus 10.

In the present embodiment, the receiving apparatus 20 is the electric car 21. The electric car 21 supplies power from the internal battery 24 to a motor 25, thereby causing the motor 25 to operate. In so doing, the electric car 21 is able to run. The electric car 21 is further provided with a receiving coil 22, a power receiver 23, and a wireless signal receiver 26. The receiving coil 22 is supplied with power from the transmitting coil 12, on the basis of electromagnetic resonance. The receiving coil 22 has the same resonant frequency as that of the transmitting coil 12. The power receiver 23 supplies the battery 24 with the power that was supplied to the receiving coil 22. The wireless signal receiver 26 is able to receive move and stop command signals sent by radio, for example, from a wireless signal transmitter 19 (to be hereinafter described) in the power transmitter 11. Upon receiving a move command signal or a stop command signal in the wireless signal receiver 26, the electric car 21 performs a control to provide information prompting the driver to move the electric car 21 forward or back, or bring the electric car 21 to a stop. Such information may be displayed on the display apparatus (such as a liquid crystal display, for example) of a car navigation system or similar equipment, for example. Alternatively, the electric car 21 may be provided with audio output apparatus (such as one or more speakers), with the above information being output as audio.

Figure 6:
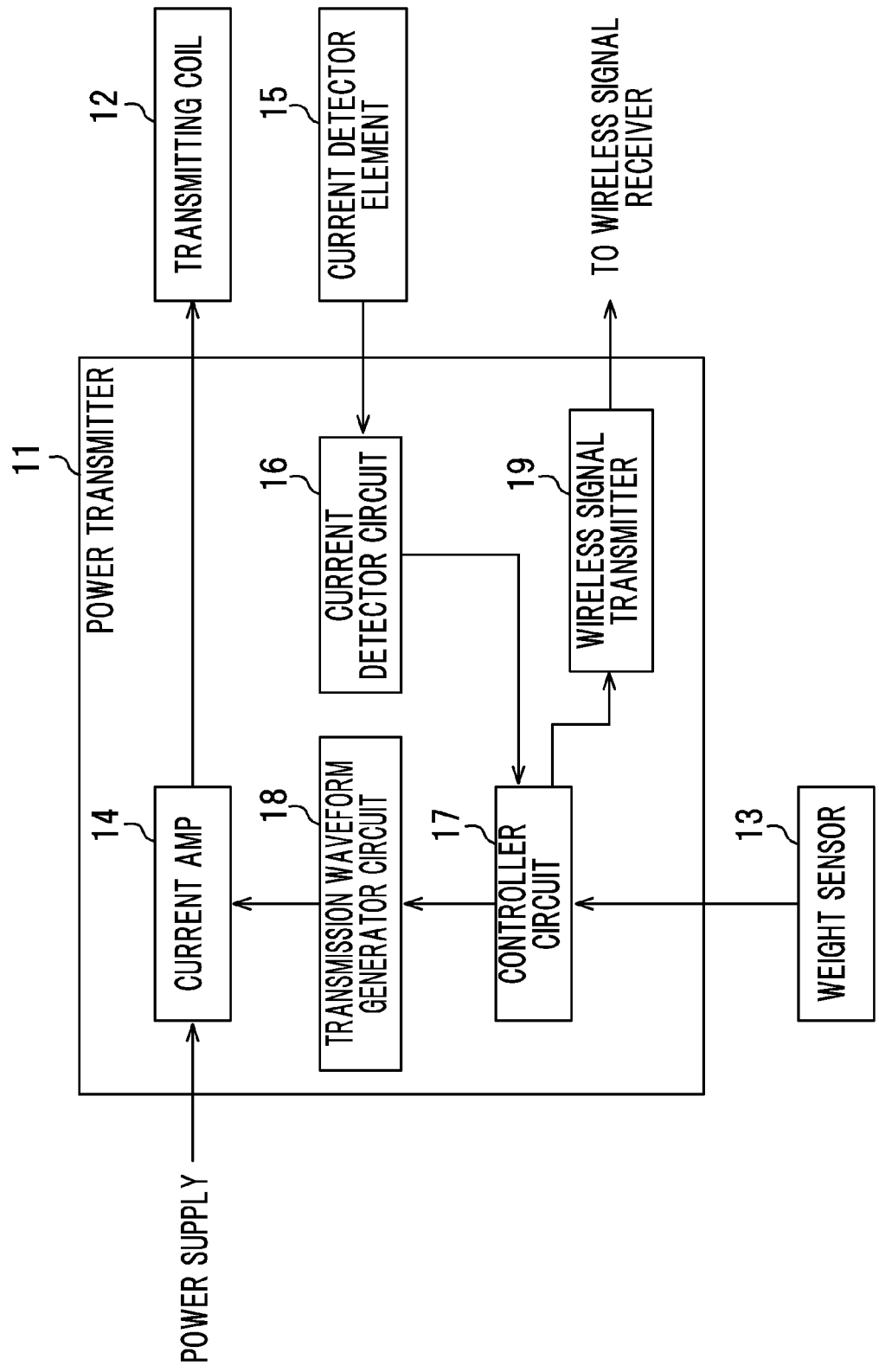
FIG. 6 is a block diagram illustrating a detailed configuration of a power transmitter.

FIG. 6 is a block diagram illustrating a detailed configuration of the power transmitter 11. The power transmitter 11 is provided with a current amp 14, a current detector circuit 16, a controller circuit 17, a transmission waveform generator circuit 18, and the wireless signal transmitter 19. Additionally, a current detector element 15 is disposed near the transmitting coil 12.

The current detector element 15 is able to detect current flowing into the transmitting coil 12. The current detector element 15 may, for example, detect the magnetic field energy produced as a result of the current flowing into the transmitting coil 12, and be realized as a Hall sensor that outputs the detected magnetic field energy as a current value.

The current detector circuit 16 converts the current value output from the current detector element 15 into a voltage and outputs the result, which is input into the controller circuit 17 as a current waveform.

The controller circuit 17 determines the coupling strength between the transmitting coil 12 and the receiving coil 22 by computing the amplitude and phase change with the current detected by the current detector circuit 16 when sweeping the frequency of the power supplied to the transmitting coil 12. On the basis of the determination result, the controller circuit 17 commands the wireless signal transmitter 19 to output a move command signal or a stop command signal, or alternatively, output the amplitude information and frequency information to the transmission waveform generator circuit 18. Herein, the move command signal is a signal including information instructing the user of the receiving apparatus 20 (i.e., the electric car 21 in the present embodiment) to move the receiving apparatus 20. The stop command signal is a signal including information instructing the user of the receiving apparatus 20 (i.e., the electric car 21 in the present embodiment) to bring the receiving apparatus 20 to a stop. When the determined coupling strength does not satisfy a coupling strength in the strongly coupled regime, the controller circuit 17 performs control such that a move command signal is output to the receiving apparatus 20. When the determined coupling strength has reached a coupling strength in the strongly coupled regime, the controller circuit 17 performs control such that a stop command signal is output to the receiving apparatus 20.

On the basis of the amplitude information and frequency information output from the controller circuit 17, the transmission waveform generator circuit 18 supplies current from the current amp 14 to the coil.

Hereinafter, operation will be described for a charging system adopting a wireless power supply system in accordance with the present embodiment.

Figure 7:
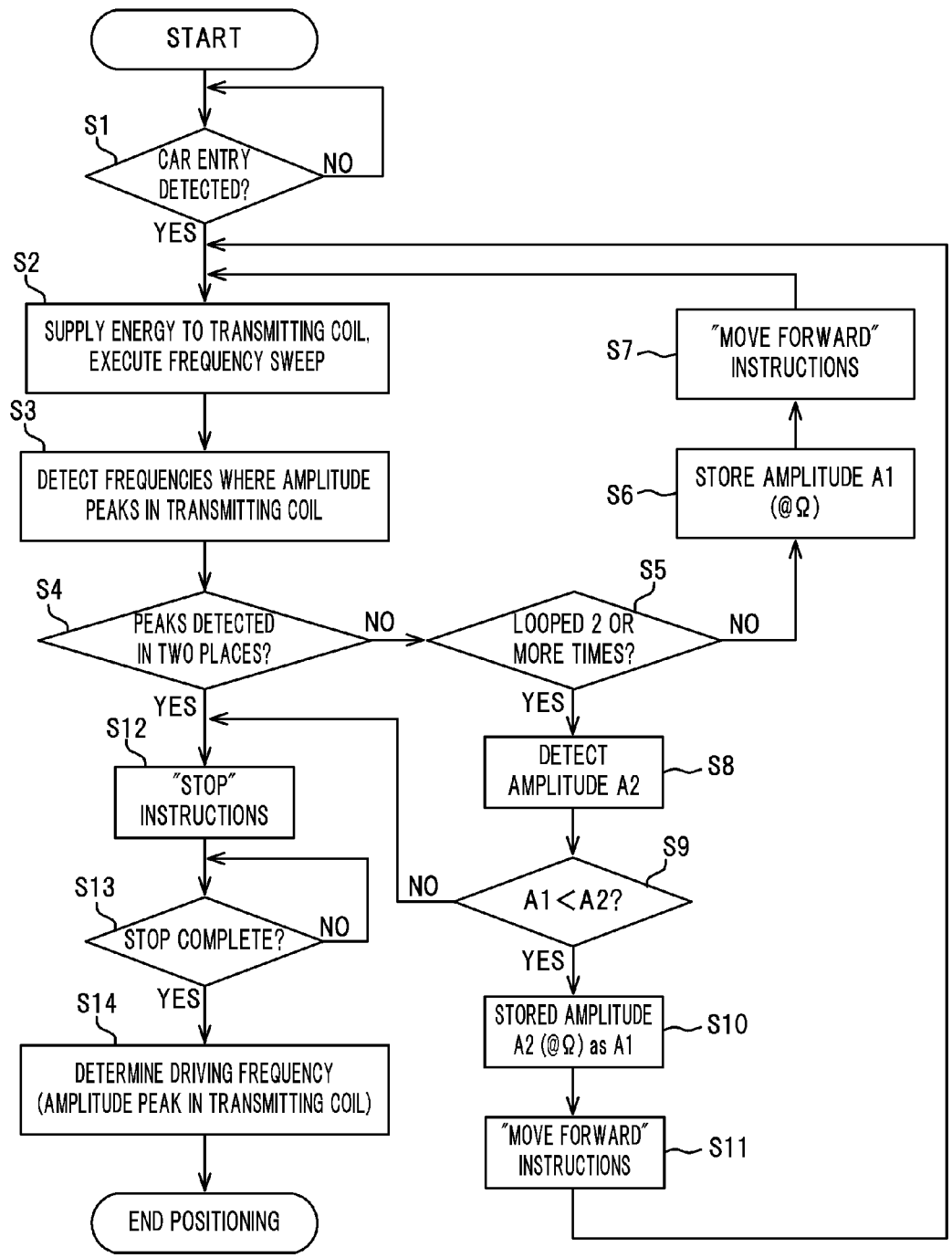
FIG. 7 is a flowchart for positioning control.
Figure 8A:
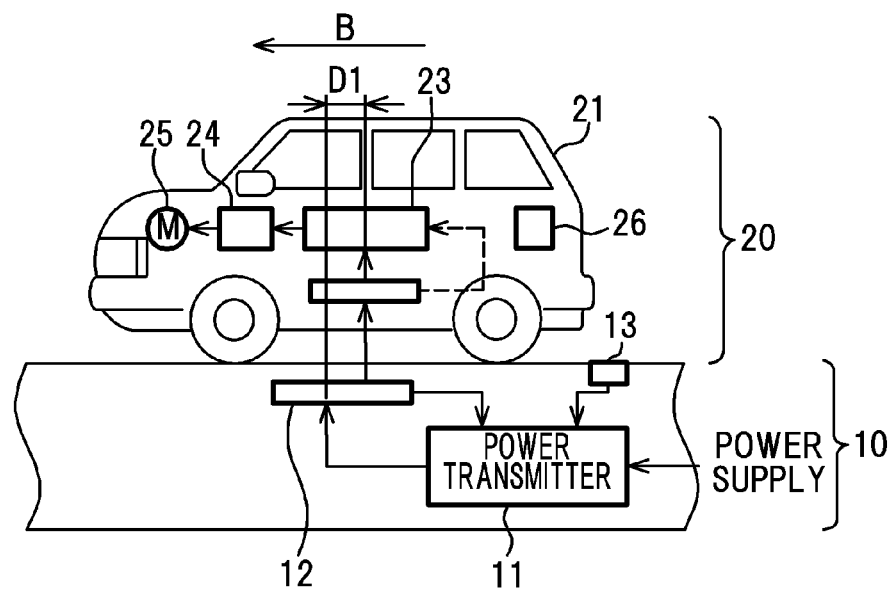
FIG. 8A is a schematic diagram of a charging system in the weakly coupled regime.
Figure 8B:
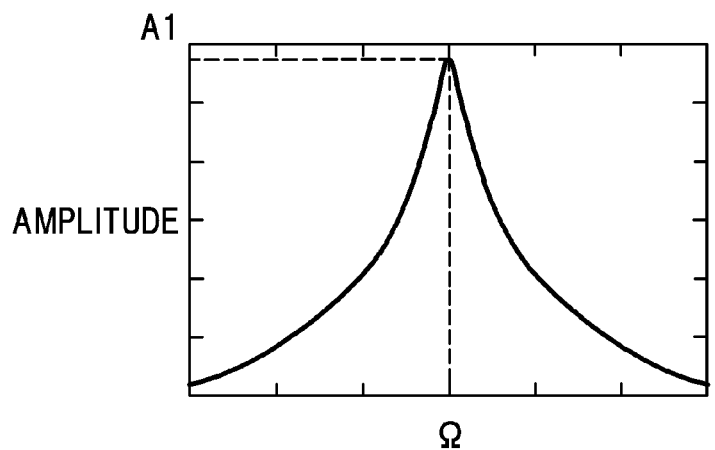
FIGS. 8B to 8E are graphs illustrating the frequency characteristics of a charging system in the weakly coupled regime.
Figure 8C:
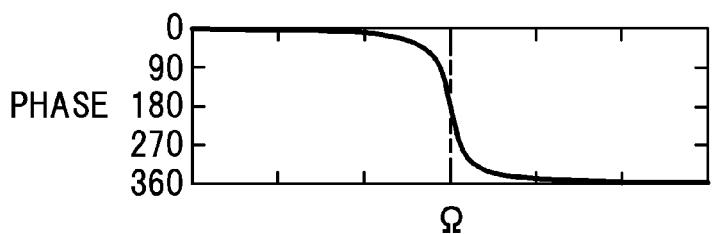
Figure 8D:
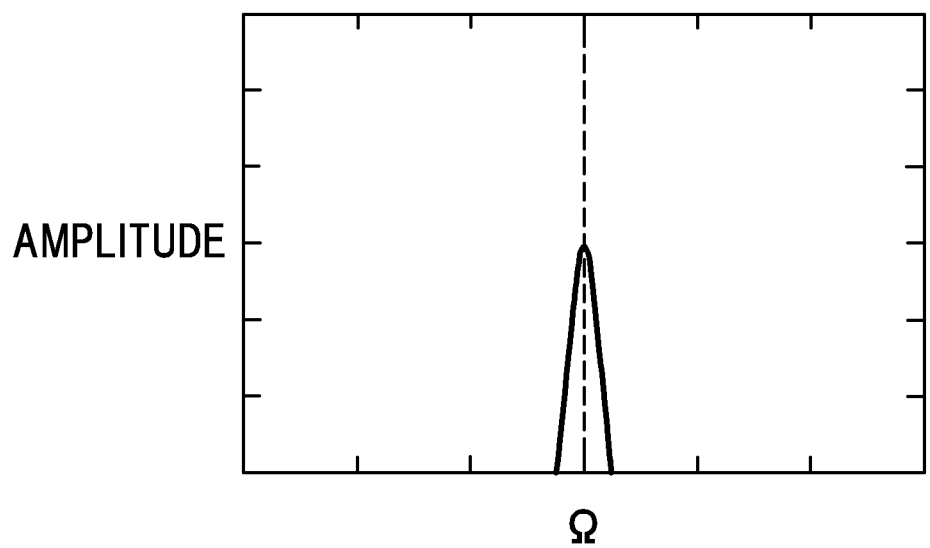
Figure 8E:
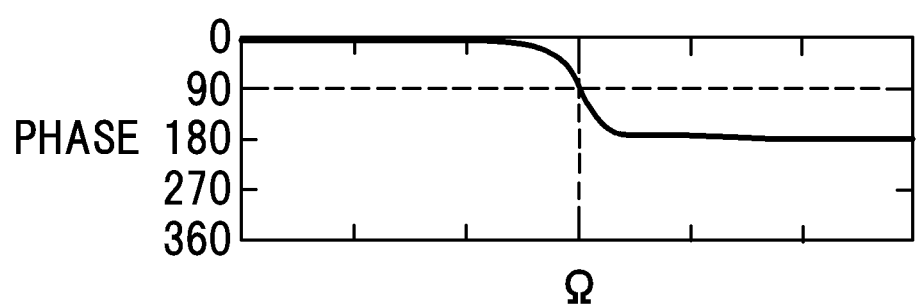
Figure 9A:
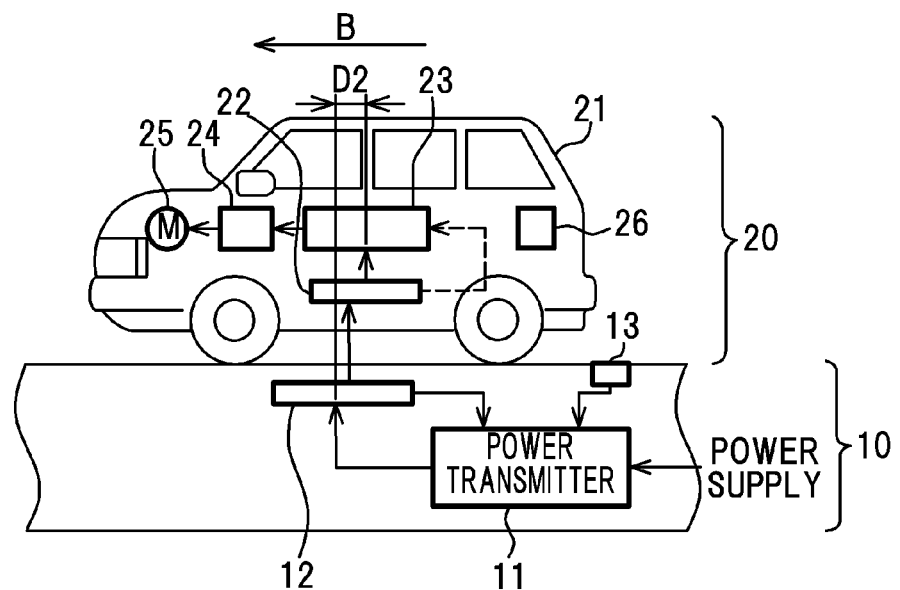
FIG. 9A is a schematic diagram of a charging system.
Figure 9B:
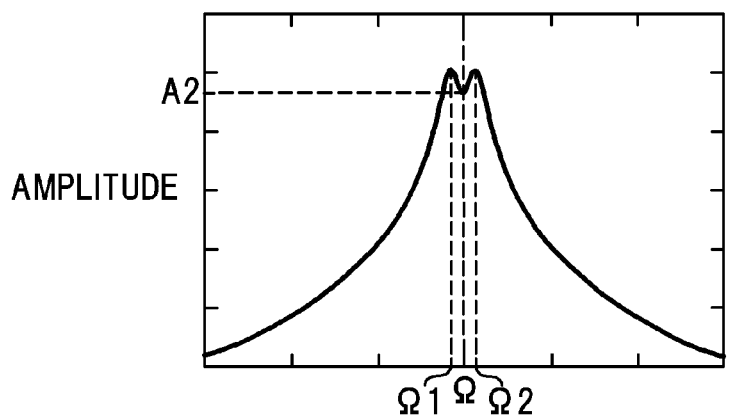
FIGS. 9B to 9E are graphs illustrating the frequency characteristics of a charging system.
Figure 9C:
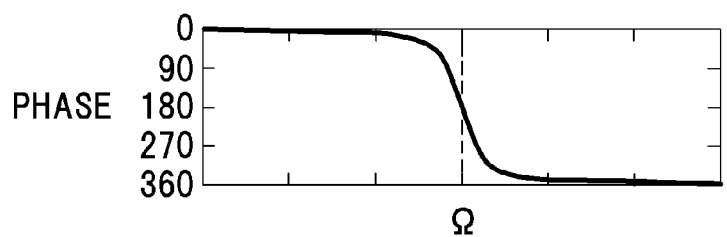
Figure 9D:
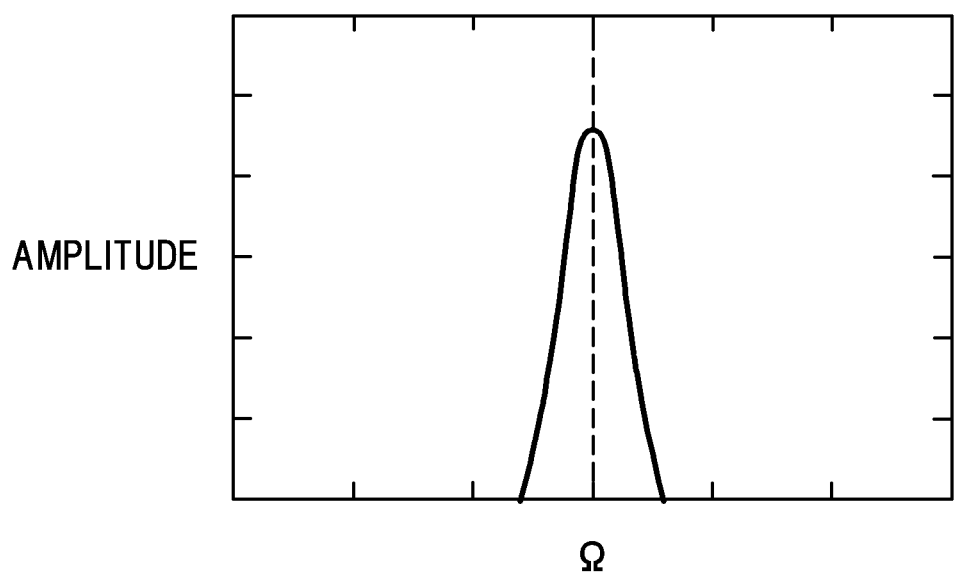
Figure 9E:
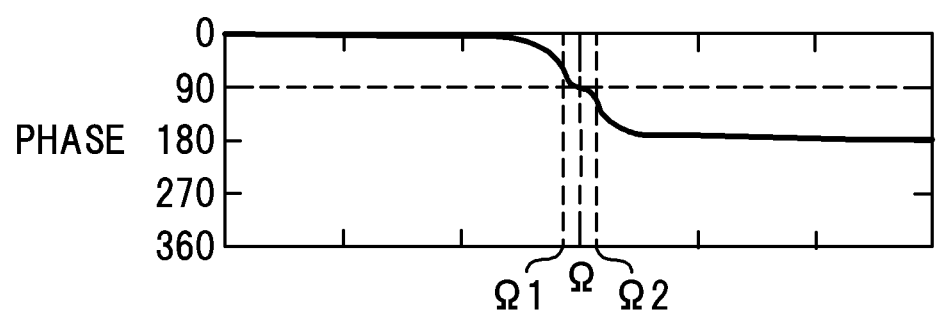
Figure 10A:
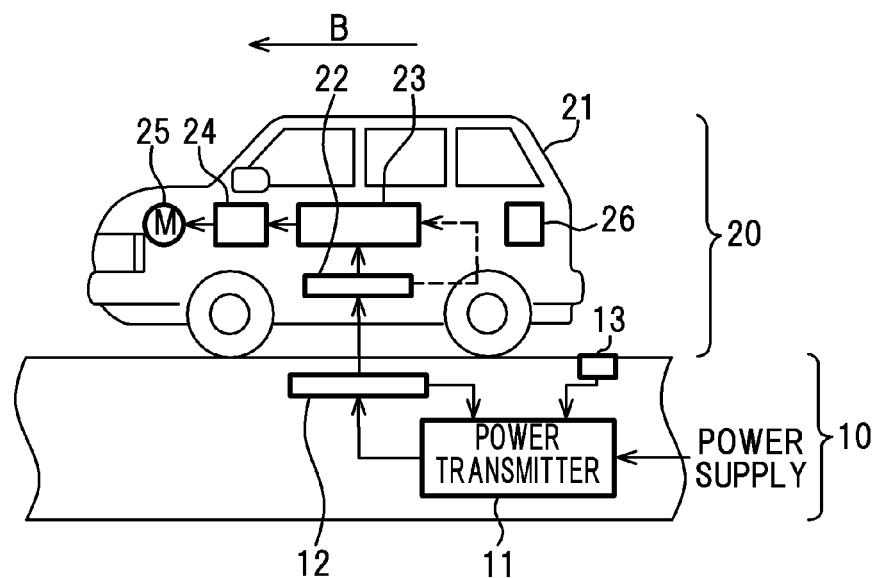
FIG. 10A is a schematic diagram of a charging system in the strongly coupled regime.
Figure 10B:
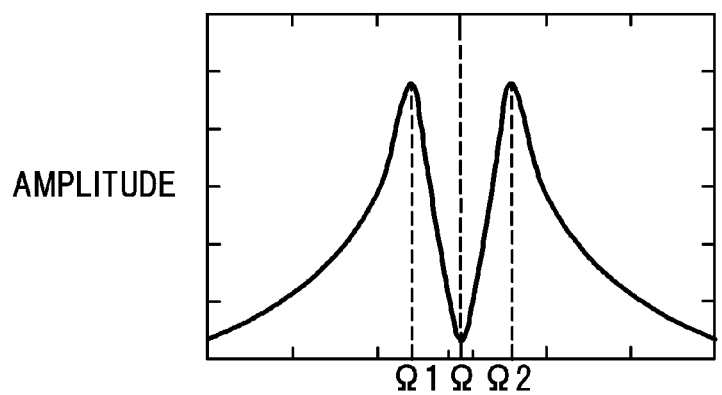
FIGS. 10B to 10E are graphs illustrating the frequency characteristics of a charging system in the strongly coupled regime.
Figure 10C:
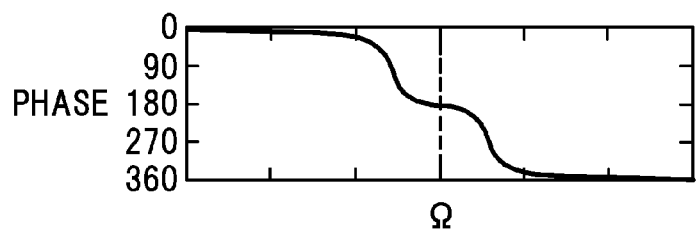
Figure 10D:
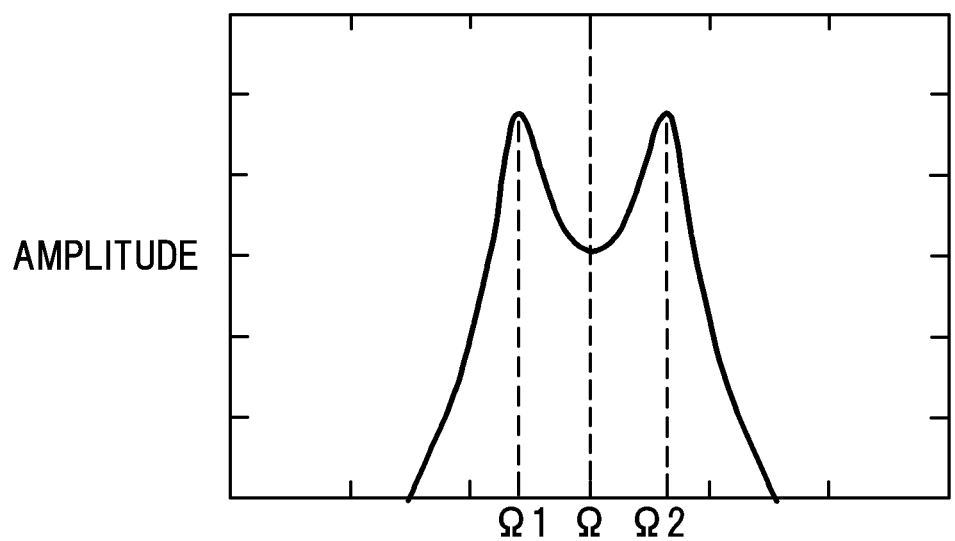
Figure 10E:
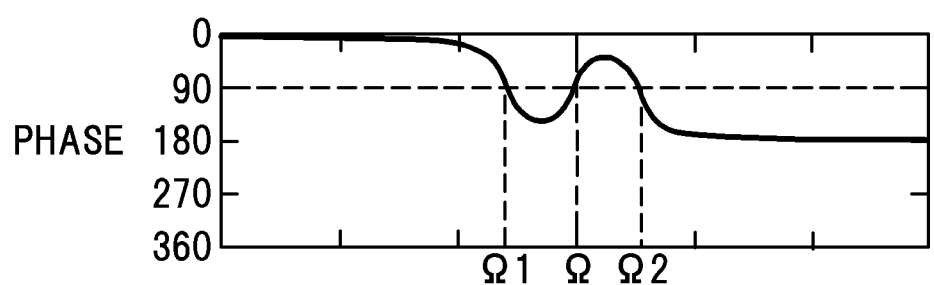
Figure 11A:
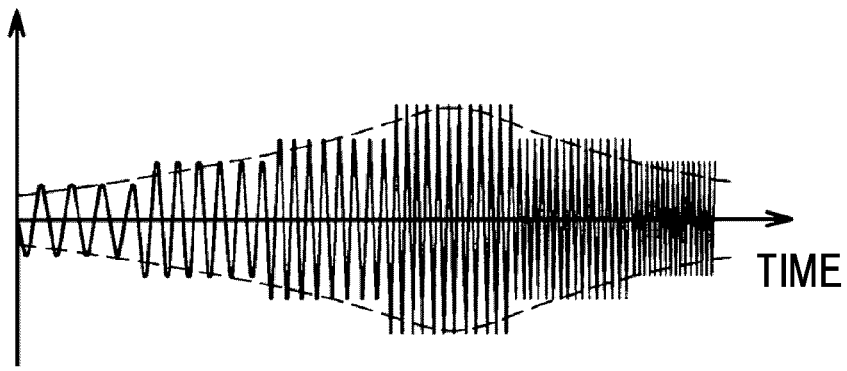
FIG. 11A is a waveform diagram illustrating current in a transmitting coil in the case where the ratio κ/G of the coupling strength κ versus the energy loss G is less than or equal to 1.
Figure 11B:
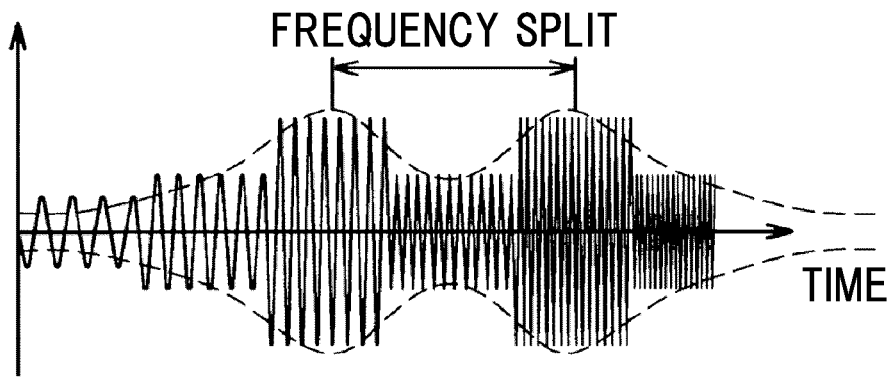
FIG. 11B is a waveform diagram illustrating current in a transmitting coil in the case where the ratio κ/G of the coupling strength κ versus the energy loss G is greater than 1.

FIG. 7 illustrates a control flow of a charging system adopting a wireless power supply system. FIG. 8A is a schematic diagram of the system in a state where the relative positions of the transmitting coil 12 and the receiving coil 22 are significantly misaligned (i.e., the weakly coupled regime). FIGS. 8B and 8C illustrate the angular frequency characteristics of the transmitting coil 12. FIGS. 8D and 8E illustrate the angular frequency characteristics of the receiving coil 22. FIG. 9A is a schematic diagram of the system in a state where the relative positions of the transmitting coil 12 and the receiving coil 22 are slightly misaligned. FIGS. 9B and 9C illustrate the angular frequency characteristics of the transmitting coil 12. FIGS. 9D and 9E illustrate the angular frequency characteristics of the receiving coil 22. FIG. 10A is a schematic diagram of the system in a state where the relative positions of the transmitting coil 12 and the receiving coil 22 are aligned (i.e., the strongly coupled regime). FIGS. 10B and 10C illustrate the angular frequency characteristics of the transmitting coil 12. FIGS. 10D and 10E illustrate the angular frequency characteristics of the receiving coil 22. FIG. 11A illustrates the waveform of current flowing into the transmitting coil 12 in the weakly coupled regime (i.e., where $\kappa/G \leq 1$). FIG. 11B illustrates the waveform of current flowing into the transmitting coil 12 in the strongly coupled regime (i.e., where $\kappa/G > 1$).

First, the transmitting apparatus 10 detects whether or not the electric car 21 has entered the charging area. More specifically, the transmitting apparatus 10 detects that the electric car 21 has entered the charging area when the weight sensor 13 detects the weight of the electric car 21, as a result of the tires of the electric car 21 passing over the weight sensor 13 (S1).

At this point, the position of the electric car 21 in the charging area is undetermined, and the electric car 21 might not be positioned for optimal power supply efficiency. Therefore, in the present system, the coupling state between the transmitting coil 12 and the receiving coil 22 is first checked. More specifically, the power transmitter 11 causes current to flow into the transmitting coil 12. At this point, the power transmitter 11 sweeps the angular frequency of the power supplied to the transmitting coil 12. The current detector element 15 detects the current flowing into the transmitting coil 12, and sends the current waveform to the current detector circuit 16. The current detector circuit 16 converts the detected values sent from the current detector element 15 into voltages, and then sends the resulting waveform to the controller circuit 17 (S2).

Next, from the waveform sent from the current detector circuit 16, the controller circuit 17 detects the one or more angular frequencies where the amplitude peaks. More specifically, the controller circuit 17 accumulates angular frequency and amplitude information on the basis of the waveform sent from the current detector circuit 16, detects one or more amplitude peaks, and then detects the angular frequencies for the one or more detected amplitude peaks (S3).

Next, the controller circuit 17 determines whether or not amplitude peaks were detected at two angular frequencies. More specifically, the angular frequency error between the 90-degree phase of the power input into the transmitting coil 12 and the current flowing into the transmitting coil 12 is compared to a threshold value. If the angular frequency error exceeds the threshold value, then the amplitude peaks have been detected at two places. For example, if there is significant misalignment in the relative positions of the transmitting coil 12 and the receiving coil 22 (such as the misalignment D1 between the transmitting coil 12 and the receiving coil 22 in FIG. 8A, for example), then the current waveform of the transmitting coil 12 becomes like that illustrated in FIG. 11A. Consequently, an amplitude peak is produced at only the angular frequency $\Omega$, as illustrated in FIG. 8B, and the determination in this step returns a NO (S4).

Next, the controller circuit 17 determines whether or not the determination in step S4 has returned a NO two or more times (S5). If the NO determination returned in step S4 is the first such determination (i.e., if the determination in S5 returns a NO), then the controller circuit 17 stores the amplitude information A1 for the current angular frequency $\Omega$ (S6). Next, the controller circuit 17 commands the wireless signal transmitter 19 to output a move command signal. On the basis of the command from the controller circuit 17, the wireless signal transmitter 19 outputs a move command signal to the wireless signal receiver 26 in the electric car 21. This move command signal includes information prompting the driver of the electric car 21 to move the electric car 21 forward. On the basis of the move command signal received by the wireless signal receiver 26, the electric car 21 causes a message such as "Move forward" to be displayed on a display apparatus (not illustrated) (S7).

Next, the driver moves the electric car 21 forward from the position illustrated in FIG. 8A, and in the direction indicated by the arrow B, until reaching the position illustrated in FIG. 9A, for example. Next, the processing in steps S2 and S3 is executed again in the transmitting apparatus 10, and one or more angular frequencies are detected where peaks are produced in the amplitude of the current flowing into the transmitting coil 12.

Next, the controller circuit 17 determines whether or not amplitude peaks were detected at two places. More specifically, if there is slight misalignment in the relative positions of the transmitting coil 12 and the receiving coil 22 (such as the misalignment D2 between the transmitting coil 12 and the receiving coil 22 in FIG. 9A (wherein D1>D2)), then two amplitude peaks are produced (at angular frequencies $\Omega 1$ and $\Omega 2$), as illustrated in FIG. 9C. However, in this case the angular frequency error for the 90-degree phase of the current (i.e., the error between the angular frequencies $\Omega$ and $\Omega$, and the error between the angular frequencies $\Omega$ and $\Omega 2$) is small. Thus, the angular frequency error is determined to be less than the threshold value. Consequently, the determination in this step returns a NO (S4).

Next, the controller circuit 17 determines whether or not the determination in step S4 has returned a NO two or more times (S5). If the NO determination returned in step S4 is the second such determination (i.e., if the determination in S5 returns a YES), then the controller circuit 17 detects the amplitude information A2 for the current angular frequency $\Omega$ (S8). Next, the controller circuit 17 compares the amplitude information A1 to the amplitude information A2 (S9). If it is determined that the amplitude information A2 is greater than the amplitude information A1 (i.e., if the determination in S9 returns a YES), then the controller circuit 17 stores the amplitude information A2 as A1, and commands the wireless signal transmitter 19 to output a move command signal (S11).

Next, the driver moves the electric car 21 forward from the position illustrated in FIG. 9A, and in the direction indicated by the arrow B, until reaching the position illustrated in FIG. 10A, for example. At this point, the transmitting apparatus 10 executes the processing in steps S2 and S3 again, and detects one or more angular frequencies where peaks are produced in the amplitude of the current flowing into the transmitting coil 12. If the electric car 21 is at the position illustrated in FIG. 10A, or in other words, if there is almost no misalignment in the relative positions of the transmitting coil 12 and the receiving coil 22, then the coils enter the strongly coupled regime, and the waveform of the current flowing into the transmitting coil 12 becomes like that illustrated in FIG. 11B.

Next, the controller circuit 17 determines whether or not current amplitude peaks were detected at two places. More specifically, the angular frequency error for the 90-degree phase of the current (i.e., the error between the angular frequencies $\Omega$ and $\Omega 1$, and the error between the angular frequencies $\Omega$ and $\Omega 2$) is compared to a threshold value. If the angular frequency error is greater than the threshold value, then it is determined that current amplitude peaks have been detected in two places. If the transmitting coil 12 and the receiving coil 22 have entered the strongly coupled regime as illustrated in FIG. 10A, then the angular frequency error for the 90-degree phase of the current is large, as illustrated in FIGS. 10B and 10C. Thus, the angular frequency error is determined to be greater than the threshold value. Consequently, the determination in this step returns a YES, and the process proceeds to step S12 (S4).

In contrast, if the controller circuit 17 determines in step S9 that the amplitude information A2 is greater than the amplitude information A1 (i.e., a NO determination), then the process proceeds to step S12. In this case, peaks did not appear in two places, even though the positioning was optimized. In other words, since the coils did not enter the strongly coupled regime, the coils are thus in the weakly coupled regime, but positioning is terminated at this point. In other words, as described earlier with reference to FIG. 2A, there is a tendency for the amplitude at the angular frequency $\Omega$ to decrease as the coupling strength between the transmitting coil 12 and the receiving coil 22 increases. Given that the amplitude information A2 has become greater than the amplitude information A1, the coupling has weakened since the last iteration. For this reason, it is determined that the transmitting coil 1 and the receiving coil 22 have been optimally positioned within the weakly coupled regime.

In step S12, the controller circuit 17 commands the wireless signal transmitter 19 to output a stop command signal. On the basis of the command from the controller circuit 17, the wireless signal transmitter 19 outputs a stop command signal to the wireless signal receiver 26 in the electric car 21. The stop command signal includes information prompting the driver of the electric car 21 to bring the electric car 21 to a stop. On the basis of the stop command signal received by the wireless signal receiver 26, the electric car 21 causes a message such as "Stop" to be displayed on a display apparatus (not illustrated).

Next, the controller circuit 17 determines whether or not the electric car 21 has stopped. The method for determining whether or not the electric car 21 has stopped may involve, for example, detecting amplitude variation in the current flowing into the transmitting coil 12 (S13).

According to the above steps S1 to S12, positioning of the electric car 21 is completed.

Next, the controller circuit 17 performs control such that a current of angular frequency $\Omega$ (see FIG. 10B) is applied to the transmitting coil 12. More specifically, the controller circuit 17 sends the angular frequency $\Omega$ and corresponding amplitude information to the transmission waveform generator circuit 18. On the basis of the angular frequency $\Omega$ and corresponding amplitude information sent from the controller circuit 17, the transmission waveform generator circuit 18 provides the current amp 14 with a power transmission signal. The current amp 14 then supplies a current based on the power transmission signal to the transmitting coil 12. The transmitting coil 12 produces magnetic field energy due to the current sent from the current amp 14, and resonates with the receiving coil 22. In so doing, power may be supplied from the transmitting coil 12 to the receiving coil 22 with maximal coupling strength $\kappa$ between the transmitting coil 12 and the receiving coil 22.

3. Advantages of the Embodiment, Etc.

According to a wireless power supply system in accordance with an embodiment of the present invention, the current flowing into a transmitting coil 12 is detected, and the state wherein amplitude peaks are produced in the angular frequency characteristics of the current is also detected. In so doing, positioning control may be conducted such that the coupling strength between the transmitting coil 12 and a receiving coil 22 is maximized. The positioning method for the wireless power supply system in accordance with an embodiment of the present invention is more direct than methods that use components such as mechanical guides or optical sensors, and enables more precise positioning control to be conducted.

Furthermore, in the foregoing embodiment, the coupling strength due to the frequency characteristics of the transmitting coil 12 is determined as a result of detecting the current in the transmitting coil 12 by sweeping the power input into the transmitting coil. For this reason, it is possible to determine the coupling strength without detecting the current in the receiving coil 22. In other words, the coupling strength may be determined without adding new functionality on the side of the receiving coil 22.

The foregoing embodiment is configured to detect one or more amplitude peaks in the current flowing into the transmitting coil 12 on the basis of the angular frequency error of the current when the phase between the power transmission signal supplied from the transmission waveform generator circuit and the current flowing into the transmitting coil 12 is 90 degrees. However, it should be appreciated that an embodiment may also be configured to detect whether or not the phase inverts between the amplitude peaks. More specifically, consider the case when amplitude peaks are produced in two places (i.e., at the angular frequencies Q1 and Q2) in the current in the transmitting coil 12, as illustrated in FIG. 10B. In this case, by detecting the phase inversion (i.e., a phase difference of 180 degrees) occurring between the angular frequencies $\Omega 1$ and $\Omega 2$ of the two amplitude peaks, it may be determined that the coupling strength between the transmitting coil 12 and the receiving coil 22 is strong. Thereafter, the embodiment may be controlled so as to supply power from the transmitting coil 12 to the receiving coil 22.

Alternatively, instead of determining the coupling strength from the amplitude of the current in the transmitting coil 12, the coupling strength may be determined using just the phase of the current in the transmitting coil 12. For example, the coupling strength may be determined on the basis of phase variations in the current in the transmitting coil 12 within the frequency sweep range of frequencies. More specifically, consider the case when the phase variation crosses 90 degrees three times within the frequency sweep range, as illustrated in FIG. 10C. In this case, the controller circuit 17 is able to determine that the coils are in the strongly coupled regime.

Additionally, the foregoing embodiment is configured to position the transmitting coil 12 and the receiving coil 22 by monitoring only the current flowing into the transmitting coil 12. However, an embodiment may also be configured to position the transmitting coil 12 and the receiving coil 22 by also monitoring the current flowing into the receiving coil 22. In this case, the current flowing into the receiving coil 22 is detected using a current detector element (not illustrated, but similar to the current detector element 15 in the transmitting apparatus 10) at the receiving apparatus 20. On the basis of the signal converted by the current detector element, it is detected in the power receiver 23 when the transmitting coil 12 and the receiving coil 22 enter the strongly coupled regime. The power receiver 23 then transmits the detection results to the power transmitter 11 by radio, for example. On the basis of the coupling strength detection result based on the current flowing into the transmitting coil 12, as well as the coupling strength detection result sent from the power receiver 23, the power transmitter 11 controls the current supplied to the transmitting coil 12, and supplies power to the receiving coil 22.

Additionally, the foregoing embodiment is configured to use a weight sensor 13 to detect when the electric car 21 has entered the charging area. However, the electric car 21 may also be provided with a remote control apparatus, and the transmitting apparatus 10 may be provided with a signal receiver able to receive wireless signals transmitted from the remote control apparatus. An embodiment may be configured to start the positioning control (i.e., the control flow illustrated in FIG. 7) once the driver operates the remote control apparatus after parking the electric car 21 in the charging area.

In the foregoing embodiment, a charging system for the battery of an electric car is given as one example of a wireless power supply system. However, it should be appreciated that an embodiment of the present invention is also useful for the charging systems of devices driven by rechargeable batteries, such as mobile phone handsets and digital cameras, for example. Moreover, an embodiment of the present invention is not limited to charging systems, and is also useful for systems provided with a power transmitting apparatus, as well as a power receiving apparatus that is driven while consuming power supplied from the power transmitting apparatus. In other words, an embodiment of the present invention is also useful for systems wherein the power receiving apparatus is not provided with recharging functions.

Figure 12:
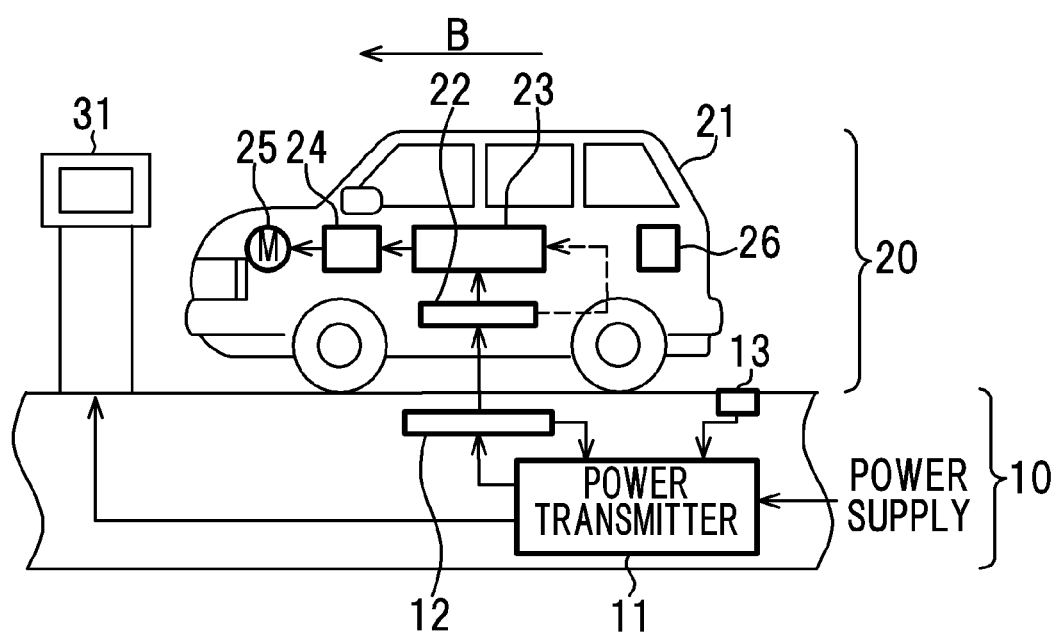
FIG. 12 is a schematic diagram illustrating an embodiment of a charging system.

The foregoing embodiment is configured such that a move command signal or a stop command signal is sent to the electric car 21 wirelessly. However, the transmitting apparatus 10 may also be provided with a display apparatus, and configured to display on the display apparatus instructions for the driver of the electric car 21. FIG. 12 is a schematic diagram of a charging system wherein the transmitting apparatus 10 is provided with a display apparatus 31. The display apparatus 31 is mounted upright on the ground where the transmitting apparatus 10 is disposed. In the transmitting apparatus 10 illustrated in FIG. 12, the wireless signal transmitter 19 may be omitted from the power transmitter 11. The display apparatus 31 is able to display instructions for the driver as text, such as the message "Move forward" produced by control from the power transmitter 11. Herein, the information displayed by the display apparatus 31 may be text information as described above, or alternatively, the display apparatus 31 may display a circle (O) symbol when the vehicle is at the optimal charging position, and a cross (X) symbol when the vehicle is not at the optimal charging position. According to the charging system illustrated in FIG. 12, an electric car may be positioned at an optimal charging position, even if the electric car is not provided with an apparatus for receiving wireless signals. In other words, the charging system illustrated in FIG. 12 is a highly versatile system.

The transmitting apparatus 10 in the foregoing embodiment is one example of a transmitting apparatus in accordance with the present invention. The power transmitter 11 in the foregoing embodiment is one example of a power transmitter in accordance with the present invention. The transmitting coil 12 in the foregoing embodiment is one example of a transmitting coil in accordance with the present invention. The receiving apparatus 20 and the electric car 21 in the foregoing embodiment are examples of a receiving apparatus in accordance with the present invention. The receiving coil 22 in the foregoing embodiment is one example of a power transmitter in accordance with the present invention. The current detector circuit 16 in the foregoing embodiment is one example of a detector in accordance with the present invention. The controller circuit 17 in the foregoing embodiment is one example of a controller and a determining unit in accordance with the present invention. The move command signal and the stop command signal in the foregoing embodiment are examples of a command signal in accordance with the present invention.

The present invention is useful for wireless power supply systems able to wirelessly supply power from a transmitting apparatus to a receiving apparatus.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that various changes, substitutions, and alterations could be made hereto without departing from the spirit and scope of the invention.

The invention claimed is:

1. A wireless power supply system, comprising:
   a transmitting coil configured to transmit power in a form of magnetic field energy using magnetic resonance; and
   a power transmitter configured to supply power at a resonant frequency that produces magnetic resonance between the transmitting coil and a receiving coil;
   wherein the power transmitter includes a detector configured to detect current flowing into the transmitting coil, a controller configured to control the frequency of the power supplied to the transmitting coil, and a determining unit configured to detect an amplitude of the current detected by the detector on a basis of a frequency of the current detected by the detector and determine a coupling strength between the transmitting coil and the receiving coil on the basis of the amplitude.

2. The wireless power supply system according to claim 1, wherein the controller sweeps the frequency of the power supplied to the transmitting coil, and the determining unit determines the coupling strength between the transmitting coil and the receiving coil on the basis of a frequency characteristics of the amplitude of the current flowing into the transmitting coil as detected by the detector.

3. The wireless power supply system according to claim 1, wherein the controller sweeps the frequency of the power supplied to the transmitting coil, and the determining unit determines the coupling strength between the transmitting coil and the receiving coil on the basis of a frequency characteristics of the phase between the current flowing into the transmitting coil as detected by the detector, and the power supplied to the transmitting coil.

4. The wireless power supply system according to claim 1, wherein on the basis of the determination results of the determining unit, the power transmitter outputs a command signal to an apparatus provided in the receiving coil.

5. A wireless power supply system, comprising:
 a transmitting coil configured to transmit power in the form of magnetic field energy using magnetic resonance;
 a receiving coil configured to receive the magnetic field energy transmitted from the transmitting coil, and convert the received energy into power; and
 a power transmitter configured to supply power at a resonant frequency that produces magnetic resonance between the transmitting coil and the receiving coil;
 wherein the power transmitter includes a detector configured to detect current flowing into the transmitting coil, a controller configured to control the frequency of the power supplied to the transmitting coil, and a determining unit configured to detect an amplitude of the current detected by the detector on a basis of a frequency of the current detected by the detector and determine a coupling strength between the transmitting coil and the receiving coil on the basis of the amplitude.

6. The wireless power supply system according to claim 5, wherein the controller sweeps the frequency of the power supplied to the transmitting coil, and the determining unit determines the coupling strength between the transmitting coil and the receiving coil on the basis of the frequency characteristics of the amplitude of the current flowing into the transmitting coil as detected by the detector.

7. The wireless power supply system according to claim 5, wherein the controller sweeps the frequency of the power supplied to the transmitting coil, and the determining unit determines the coupling strength between the transmitting coil and the receiving coil on the basis of the frequency characteristics of the phase between the current flowing into the transmitting coil as detected by the detector, and the power supplied to the transmitting coil.

8. The wireless power supply system according to claim 5, wherein on the basis of the determination results of the determining unit, the power transmitter outputs a command signal to an apparatus provided in the receiving coil.

9. A wireless power supply method, comprising:
 transmitting power from a transmitting coil in the form of magnetic field energy using magnetic resonance;
 supplying power at a resonant frequency that produces magnetic resonance between the transmitting coil and a receiving coil;
 detecting current flowing into the transmitting coil;
 detecting an amplitude of the detected current on a basis of a frequency of the detected current;
 determining a coupling strength between the transmitting coil and the receiving coil on the basis of the amplitude.

10. The wireless power supply system according to claim 1, wherein the determining unit configured to detect a peak amplitude of the detected current as the amplitude and determines the coupling strength on the basis of the peak amplitude.

11. The wireless power supply system according to claim 5, wherein the determining unit configured to detect a peak amplitude of the detected current as the amplitude and determines the coupling strength on the basis of the peak amplitude.

12. The wireless power supply method according to claim 9, wherein a peak amplitude of the detected current is detected as the amplitude and the coupling strength is determined on the basis of the peak amplitude.

* * * * *